United States Patent [19]

McClure et al.

[11] Patent Number: 5,408,925

[45] Date of Patent: Apr. 25, 1995

[54] TRASH REMOVAL APPARATUS FOR A ROUND BALER

[75] Inventors: John R. McClure, New Holland; James T. Clevenger, Jr., Lancaster, both of Pa.

[73] Assignee: New Holland North America, Inc., New Holland, Pa.

[21] Appl. No.: 306,742

[22] Filed: Sep. 15, 1994

[51] Int. Cl.$^6$ .............................................. B30B 5/04
[52] U.S. Cl. ..................................... 100/88; 100/98 R
[58] Field of Search ....................... 56/341; 100/88, 89, 100/5, 98 R; 198/494

[56] References Cited

U.S. PATENT DOCUMENTS

| | | | |
|---|---|---|---|
| 4,072,062 | 2/1978 | Morling | 198/494 |
| 4,163,419 | 8/1979 | Molitorisz | 100/89 |
| 4,399,746 | 8/1983 | Viaud | 100/88 |
| 4,409,783 | 10/1983 | Gaeddert | 56/341 |
| 4,444,098 | 4/1984 | Soteropulos | 100/88 |
| 4,707,974 | 11/1987 | Harthoorn | 56/341 |
| 4,870,812 | 10/1989 | Jennings et al. | 56/341 |
| 5,080,009 | 1/1992 | Fritz et al. | 100/88 |
| 5,097,760 | 3/1992 | Ratzlaff et al. | 100/88 |
| 5,347,801 | 9/1994 | McIlwain | 100/89 |

*Primary Examiner*—David A. Scherbel
*Assistant Examiner*—Terrence R. Till
*Attorney, Agent, or Firm*—Frank A. Seemar; Larry W. Miller

[57] ABSTRACT

A round baler having a frame with opposing side walls, a series of inwardly facing moving surfaces defining a baling chamber for forming cylindrical packages of crop material, a pick up for feeding crop material into the chamber, a plurality of rotatable transverse rollers mounted between the opposing side walls of the frame, and a support assembly for mounting at least one of the rollers. The support includes a bearing assembly having a generally cylindrical stationary first race and a concentrically disposed generally cylindrical rotatable second race between which races a bearing cavity is formed for seating a series of bearings housed between the first and second races. The second race is rotatable with the one roller relative to the first race. A generally concentric ring shaped outer member, affixed to the outer race, includes a plurality of integral ribs extending radially and outwardly from the outer member to engage crop residue and urge it away from the journal under conditions where the roller is rotating.

10 Claims, 2 Drawing Sheets

TRASH REMOVAL APPARATUS FOR A ROUND BALER

FIELD OF THE INVENTION

This invention relates generally to agricultural machines for making round bales, and more particularly to apparatus for reducing trash accumulation in the bearing area of the transverse rolls used in round bales.

BACKGROUND OF THE INVENTION

Agricultural machines towed by a tractor across a field for picking up windrowed crop material to form a cylindrical bale are commonly referred to as round balers. These machines have either a fixed or an expandable bale forming chamber disposed between opposing vertical sidewalls. The chamber is usually defined by a floor and transverse confining means comprising a continuous flexible apron and/or a plurality of transverse rolls. Frequently the apron includes an array of side-by-side belts trained around a series of rollers that extend between the sidewalls, and the floor consists of either a large roller or a continuous conveyor belt.

During field operation, crop material such as hay is picked up from the ground and fed into the chamber. The volume of crop material increases continuously in the chamber until a compact cylindrical package is formed. The package is wrapped while still in the chamber and then ejected onto the ground as a completed bale.

Round balers of the general type mentioned above comprising a chamber defined at least partially by a plurality of side-by-side, longitudinally extending belts supported on a plurality of transverse rollers have encountered problems of varying degree caused by trash, such as stray crop material and other debris, that finds its way into the mounting bearings for the transverse rollers. When the crop material being baled is damp, and particularly if it is a short cut of grass crop, fine random debris from the crop material being formed into a cylindrical package in the chamber is also a cause for concern. Field experience has shown that standard bearing seals when continuously exposed to unwanted trash are not sufficient to prevent debris from working its way into the bearing cavity. Eventually, if permitted to go uncorrected, serious wear problems may occur culminating in bearing failure.

In one known round baler where these problems could occur the configuration includes an apron having an expandable inner course of side-by-side belts which cooperates with a sledge assembly to define a bale chamber which expands between a bale starting position and a full bale position. The sledge assembly includes a plurality of driven rollers and an idler roller in engagement with the apron belts to maintain the apron in close proximity to one of the driven rollers during movement of the sledge assembly between the bale starting and full bale positions. The idler roller is commonly referred to as a follower roll. This type of baler is disclosed in U.S. Pat. No. 4,870,812, issued Oct. 3, 1989 in the name of Richard E. Jennings, et al.

In round balers of this type, as well as all other types, durability and reliability are very important design concerns. For example, as mentioned above, serious problems arise under conditions where trash is permitted to build up in the roll bearing area resulting in down time and costly repair if not rectified on a timely basis. Of specific concern are the bearings for rolls located in particularly critical areas insofar as crop residue and debris being trapped are concerned. An example of such an area is the follower roll on the sledge assembly of the baler disclosed in U.S. Pat. No. 4,870,812, mentioned above.

Various prior art round balers have been provided with mechanisms that address the problem of unwanted trash accumulation. For example, adjacent belt paths have been transversely staggered at a particular point along their path to provide egress between adjacent belts for trapped debris as shown in U.S. Pat. No. 4,399,746, issued Aug. 23, 1983 in the name of Jean Viaud. Twisted belts have also been employed on round balers in another attempt to solve the same problem of trapped debris, which approach is disclosed in U.S. Pat. No. 4,707,974, issued Nov. 24, 1987.

In other prior art efforts to remove unwanted trash from round balers, active discharge mechanisms have been utilized, such as the transverse belt arrangement shown in U.S. Pat. No. 5,080,009, issued Jan. 14, 1992 in the name of David P. Fritz, et al, and rotating elements projecting between the belts as shown in U.S. Pat. No. 5,090,760, issued Mar. 24, 1992 in the name of Howard J. Ratzlaff, et al. In still another arrangement a passive discharge arrangement has been used wherein a discharge gate is provided in the rear section of the baler sidewall as disclosed in U.S. Pat. No. 4,444,098, issued Apr. 24, 1984 in the name of Gust S. Soteropulos.

The problem of trash accumulation in critical areas of and round balers is troublesome in varying degree throughout all baling conditions from the extremes of high moisture hay to low moisture hay or straw. When trash accumulates and eventually becomes entrapped or wraps in the roller bearing areas potentially significant problems could arise having a serious effect on baler performance.

SUMMARY OF THE INVENTION

An important object of the present invention is to provide new and useful trash removal apparatus for reducing the accumulation of debris in the roll bearing area of a round baler, such rolls being operatively mounted to either engage a bale being formed in a chamber or to accommodate belts trained therearound such as on a pivoted sledge assembly. The present invention enhances the durability and reliability of round balers and thereby improves overall performance by reducing or eliminating the incidence of failure caused by the presence of unwanted trash in the roller bearing area.

In pursuance of this and other important objects the present invention provides a new and unique improvement for round baler apparatus having a frame with opposing side walls, conveying means including a series of inwardly facing moving surfaces defining a baling chamber for forming cylindrical bales of crop material, means for feeding crop material into the chamber, a plurality of rotatable transverse rollers mounted between the opposing side walls of the frame for operatively supporting the conveying means, and support means having a bearing assembly for mounting at least one of the rollers, which bearing assembly includes a generally cylindrical stationary first race and a concentrically disposed generally cylindrical rotatable second race between which races a bearing cavity is formed for seating a series of bearings housed between the first and second races, the second race being rotatable with the at least one roller relative to the first race. More particularly, the invention contemplates an improvement comprising a generally concentric ring shaped outer member affixed to the outer race, and a plurality of ribs extending from the outer member to engage crop residue and urge it away from the support means under conditions where the roller is rotating.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
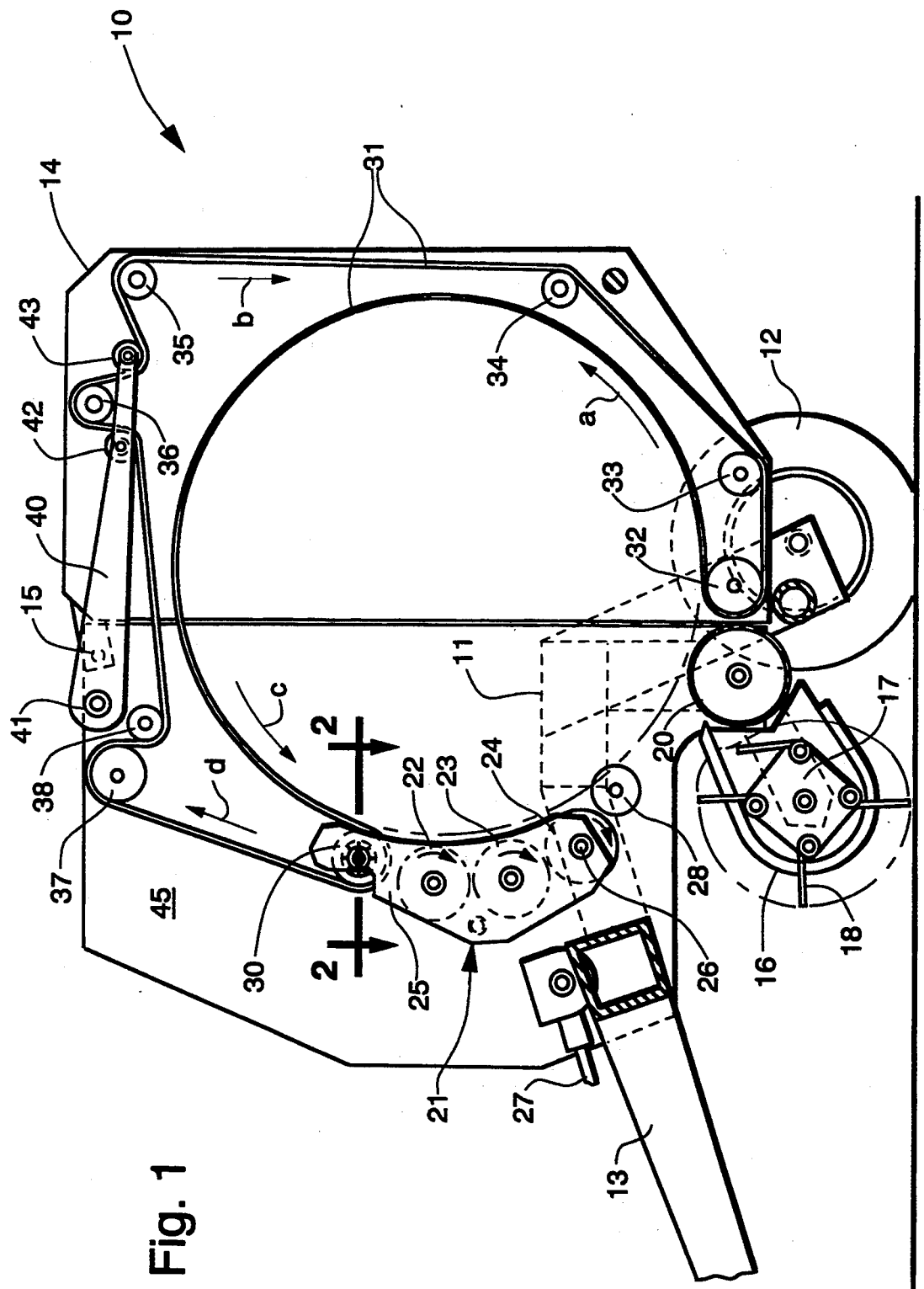
FIG. 1 is a diagrammatic side elevational view of a round baler in which the present invention is embodied.

Referring now to the drawings for a more detailed description of the preferred embodiment of the invention, FIG. 1 diagrammatically depicts an expandable chamber round baler 10 of the type disclosed in detail in U.S. Pat. No. 4,870,812 issued on Oct. 3, 1989 in the name of R. E. Jennings et al. It includes a main frame 11 supported by a pair of wheels 12 (only one shown). A tongue 13 is provided on the forward portion of main frame 11 for connection to a tractor (not shown). A tailgate 14 is pivotally connected to main frame 11 by stub shaft 15 and a similar opposing stub shaft (not shown) so that tailgate 14 may be pivoted from the closed position shown in FIG. 1 to an opened position shown and described in the Jennings et al patent mentioned above. A conventional pickup 16 is mounted on main frame 11 by a pair of brackets 17 (only one shown) and is supported in a well known manner. The pickup 16 includes a plurality of fingers or tines 18 moveable in a predetermined path (shown in phantom outline) to lift crop material from the ground and deliver it rearwardly toward a floor roll 20 which is rotatably mounted on main frame 11.

In accordance with the baler in which the present invention is embodied, a sledge assembly 21 includes a plurality of rollers 22, 23, 24 extending transversely of main frame 11 in an arcuate arrangement and journalled at the ends thereof in a pair of arcuately shaped opposing arms 25, only one of which is shown. Arms 25 are pivotally mounted inside main frame 11 on a pair of stub shafts 26 (only one shown) for permitting movement of sledge assembly 21 between a bale starting position, shown and described in Jennings et al, and a full bale position shown in FIG. 1. Rollers 22, 23, 24 are driven in a clockwise direction as indicated in FIG. 1, by conventional means (for example, chains and sprockets or gears) connected with a drive shaft 27 which is adapted for connection to the PTO of a tractor. A starter roll 28 is located adjacent roller 24 and is also driven in a clockwise direction, as viewed in FIG. 1, to enhance core starting and strip crop material from roller 24. A follower roll 30 is carried by arms 25 for movement in an arcuate path when sledge assembly 21 moves between the bale starting position (not shown) and the full bale position (shown in FIG. 1). Follower roll 30 is freely rotatable.

An apron comprises a plurality of side by side belts 31 supported on guide rolls 32, 33, 34, 35, 36 which are rotatably mounted in tailgate 14 and on a drive roll 37 which is rotatably mounted in main frame 11. Although the belts 31 pass between sledge roller 22 and follower roll 30, they are only in engagement with follower roll 30, while roller 22, due to its close proximity to belts 31, strips crop material from belts 31. Further conventional means (not shown) are connected with drive shaft 27 to provide rotation of drive roll 37 in a direction which causes movement of belts 31 in the direction indicated by arrows a, b, c and d along the path shown in FIG. 1, the inner course of which is designated by arrows a & c. An additional guide roll 38 in main frame 11 ensures proper driving engagement between belts 31 and drive roll 37. A pair of arms 40 (one shown) are pivotally mounted on main frame 11 by a cross shaft 41 for movement during bale formation between inner and outer positions, the outer full bale position being shown in FIG. 1. Arms 40 carry additional guide rolls 42, 43 for guiding belts 31. Resilient means (not shown) are provided to normally urge arms 40 toward their inner positions while resisting movement thereof to their full bale outer positions. A complete description of bale formation in baler 10 is provided in the Jennings et al patent, referred to above.

For the purpose of the present invention, it should be understood that as round baler 10 is towed across a field by a tractor, pickup tines 18 lift crop material from the ground and feed it into the bale forming chamber via a throat defined by roller 28 spaced from floor roll 20. The crop material is conveyed by floor roll 20 into engagement with a series of inwardly facing moving surfaces comprising the inner course of the apron and rollers 22, 23, 24 and 28, whereby it is coiled in a counterclock-wise direction (as viewed in FIG. 1) to form a cylindrical package of hay. During such formation, continued feeding of crop material into the chamber by pickup tines 18 causes the apron belts 31 to expand until arms 40 rotate to their outer position shown in FIG. 1. When a full size package of hay has been so formed, it is then wrapped with suitable material, such as twine or net, tailgate 14 is opened and the bale is ejected. Subsequent closing of tailgate 14 returns apron belts 31 to their initial position (not shown) and round baler 10 is again ready to form another bale.

Now turning to specific roller mounting assemblies for which the present invention is applicable, it will be understood in light of the prior art and the above description that during formation of a bale, hay is agitated and churned and in some instances, especially in certain crop types and conditions, trash comprising crop residue, dirt and other debris, has a tendency to pass through the spaces between the belts as well as the space between end walls of the baler and the adjacent end belts in the vicinity of the mounting apparatus in which the various rolls are journalled. To this end, the present invention contemplates improved roller mounting apparatus 44 shown in FIG. 2 for use in conjunction with follower roll 30 mounted on sledge 21 between sidewalls 45, an integral part of main frame 11 of round baler 10. A similar assembly could be used in conjunction with other rolls where the problem of bearing failure also occurs due to trash accumulation, such as, for example, roll 32 mounted between the sidewalls of tail gate 14 (see FIG. 1) or guide roll 38 mounted between the fixed sidewalls 45 of the baler.

Figure 2:
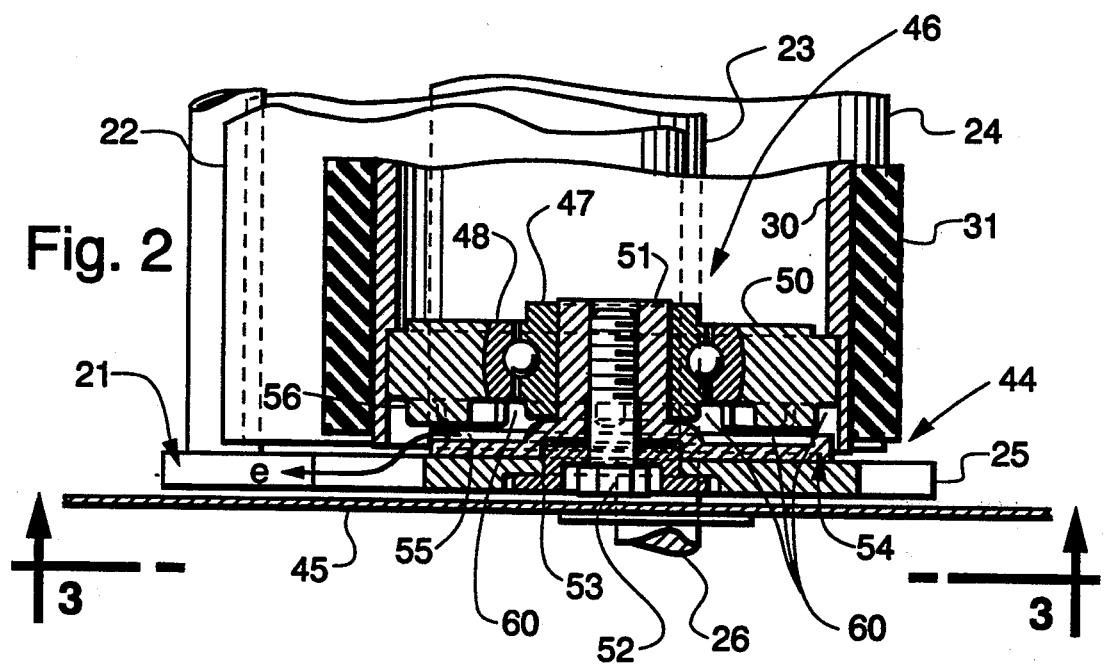
FIG. 2 is a view taken in the direction of arrows 2—2 in FIG. 1 and shows the improved structure of the present invention.
Figure 3:
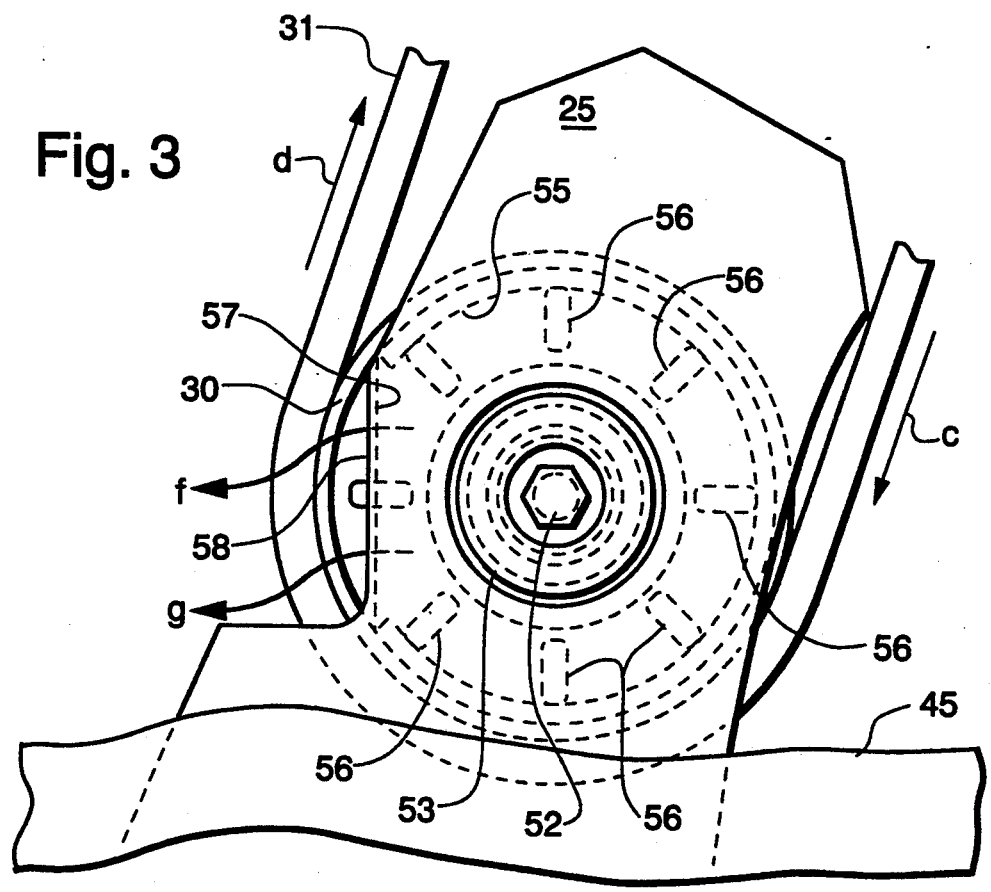
FIG. 3 is a view taken in the direction of arrows 3—3 in FIG. 2.

Now turning to FIGS. 2 and 3, follower roll 30, shown with a section of belts 31 engaging its outer surface, is mounted on arm 25 of sledge 31 via bearing assembly 46, comprising fixed inner race 47 and rotatable outer race 48, and ring shaped outer member 50, all of which are concentrically disposed. Inner race 47 is affixed to sleeve 51, which is secured to arm 25 by bolt 52 engaging the threaded bore of sleeve 51 to pull it axially against hat shaped collar 53, accommodated by a recessed portion of arm 25.

A generally disc shaped confining member 54, integral with sleeve 51, is secured against the inner surface of arm 25 by bolt 52. Confining member 54, disposed opposite and in close proximity to ring shaped outer member 50 and bearing assembly 46, includes an outer rim 55 adjacent to the inner surface of rotatable follower roll 30. Extending outwardly from outer member 50 are a plurality of radially fashioned ribs 56 spaced equidistant from each other.

A cavity 60 is defined generally by confining member 54, outer member 50 and bearing assembly 46. The notched section 57 of confining member 54 and a similar corresponding adjacent notched section 58 of arm 25 provide an opening for egress from the cavity. Ribs 56 extend from outer member 50 into cavity 60 to a position of close adjacency with the inner surface of confining member 54 for the purpose of engaging trash that collects in the cavity and expelling it via the notched out section as illustrated by directional arrows e, f, g. This close relationship also permits ribs 56 to grind large fragments of crop residue as it is being urged toward the opening.

In operation, trash such as crop residue, which may become entrapped between roller 30 and belts 31, accumulates from time to time in the area between roller mounting apparatus 44 and arm 25 or in the case of other rollers, such as roller 32 for example, between the mounting apparatus and the side wall of tailgate 44. If this trash finds its way into cavity 60, as discussed above, it is best to remove it rather than permit it to accumulate. The radially extending ribs 56 rotating with outer member 50 in a clockwise direction (FIGS. 1 and 3) engage such residue and urge it radially (by centrifugal force) and circumferentially toward and ultimately through the cavity opening, provide by the notched out portion. In the event the debris includes large pieces of crop residue the ribs will provide rubbing and grinding action in cooperation with confining member 54 to reduce it to a manageable size for expulsion and thereby prevent unwanted accumulation and avoid the deleterious effects discussed in various parts of the above description.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, although the preferred embodiment of the invention is incorporated in a round baler in which the chamber is defined by a series of belts and rolls, it is contemplated that any type of round baler, regardless of chamber defining means, whether an expandable or non-expandable chamber, could be encompassed by the principles of this invention.

Having thus described the invention, what is claimed is:

1. An improvement for removing crop residue in a round baler having a frame with opposing side walls, conveying means including a series of inwardly facing moving surfaces defining a baling chamber for forming cylindrical bales of crop material, means for feeding crop material into said chamber, a plurality of rotatable transverse rollers mounted between said opposing side walls of said frame for operatively supporting said conveying means, and support means for said rollers having a bearing assembly for mounting at least one of said rollers, said bearing assembly including a generally cylindrical stationary first race and a concentrically disposed generally cylindrical rotatable second race between which races a bearing cavity is formed for seating bearing elements housed between said first and second races, and said second race rotatable with said at least one roller relative to said first race, the improvement comprising a generally ring shaped outer member concentrically affixed to said outer race, and a plurality of ribs extend from said outer member to engage crop residue and urge said residue away from said support means under conditions where said roller is rotating.

2. In a round baler as set forth in claim 1 wherein said ribs are integral with said outer member and are disposed in a generally radial fashion.

3. In a round baler as set forth in claim 1 wherein said improvement further comprises:

a confining member having a generally flat surface opposite said ribs and in close proximity thereto whereby said crop residue is engaged therebetween.

4. In a round baler as set forth in claim 3 wherein said ribs are integral with said outer member and are disposed in a generally radial fashion.

5. In a round baler as set forth in claim 3 wherein said confining member is generally disc shaped and encloses said bearing assembly to form a cavity defined by said bearing assembly, said confining member and said outer member.

6. In a round baler as set forth in claim 5 wherein said confining member is stationary relative to said outer member and includes an opening through which said residue is expelled from said cavity.

7. In a round baler as set forth in claim 3 wherein said support means includes roll mounting means disposed between said side walls for mounting said confining member independent of said side walls.

8. In a round baler as set forth in claim 7 wherein said confining member is generally disc shaped and encloses said bearing assembly to form a cavity defined by said bearing assembly, said confining member and said outer member.

9. In a round baler as set forth in claim 8 wherein said confining member is stationary relative to said outer member and includes an opening through which said residue is expelled from said cavity.

10. In a round baler as set forth in claim 9 wherein said roll mounting means comprises an arm having an opening corresponding with said opening in said disc shaped confining member through which said residue is expelled from said cavity.

* * * * *